United States Patent
Kang (10) Patent No.: US 9,265,122 B2
(45) Date of Patent: Feb. 16, 2016

(54) DC-DC CONVERTER, ORGANIC LIGHT EMITTING DISPLAY HAVING THE DC-DC CONVERTER AND METHOD FOR OPERATING THE DC-DC CONVERTER

(71) Applicant: Samsung Display Co., LTD., Yongin, Gyeonggi-Do (KR)

(72) Inventor: Hyun-Suk Kang, Yongin (KR)

(73) Assignee: SAMSUNG DISPLAY CO., LTD. (KR)

( * ) Notice: Subject to any disclaimer, the term of this patent is extended or adjusted under 35 U.S.C. 154(b) by 190 days.

(21) Appl. No.: 14/169,950

(22) Filed: Jan. 31, 2014

(65) Prior Publication Data
US 2015/0015137 A1 Jan. 15, 2015

(30) Foreign Application Priority Data

Jul. 10, 2013 (KR) ........................ 10-2013-0080651

(51) Int. Cl.
| | |
|---|---|
| *H02H 3/087* | (2006.01) |
| *H05B 33/08* | (2006.01) |
| *H02H 3/20* | (2006.01) |
| *H02H 7/12* | (2006.01) |
| *G09G 3/32* | (2006.01) |

(52) U.S. Cl.
CPC .......... *H05B 33/0896* (2013.01); *G09G 3/3233* (2013.01); *H02H 3/202* (2013.01); *H02H 7/1213* (2013.01); *G09G 2330/02* (2013.01); *G09G 2330/026* (2013.01); *G09G 2330/028* (2013.01); *G09G 2330/04* (2013.01); *G09G 2330/12* (2013.01)

(58) Field of Classification Search
CPC .......... G09G 2330/02; G09G 2330/04; G09G 2330/028; G09G 2330/026; G09G 2330/12; G09G 3/3233; H02H 7/1213; H02H 3/202; H05B 33/0896
See application file for complete search history.

(56) References Cited

U.S. PATENT DOCUMENTS

| | | | | |
|---|---|---|---|---|
| 8,773,349 | B2 * | 7/2014 | Yoon | ........................ G09G 5/10 345/102 |
| 2011/0273109 | A1 * | 11/2011 | Park | ...................... G09G 3/3225 315/291 |
| 2012/0256897 | A1 | 10/2012 | Seo et al. | |
| 2013/0293266 | A1 * | 11/2013 | Takemura | ............ H03K 19/094 326/102 |

FOREIGN PATENT DOCUMENTS

| | | |
|---|---|---|
| KR | 1020020034607 A | 5/2002 |
| KR | 1020110123983 A | 11/2011 |
| KR | 1020120114990 A | 10/2012 |

* cited by examiner

*Primary Examiner* — Abbas Abdulselam
(74) *Attorney, Agent, or Firm* — Cantor Colburn LLP (57) ABSTRACT

A direct current-to-direct current converter includes: a buck-boost unit configured to receive an input power source supplied through an input power line, where the buck-boost unit outputs a first power source obtained by boosting the input power source and a second power source obtained by dropping the input power source; and a short-circuit sensing unit connected to the input power line and a control signal line, and configured to sense a short circuit between the input power line and the control signal line, where the short-circuit sensing unit turns off the buck-boost unit when the short circuit between the input power line and the control signal line occurs.

17 Claims, 4 Drawing Sheets

DC-DC CONVERTER, ORGANIC LIGHT EMITTING DISPLAY HAVING THE DC-DC CONVERTER AND METHOD FOR OPERATING THE DC-DC CONVERTER

This application claims priority to Korean Patent Application No. 10-2013-0080651, filed on Jul. 10, 2013, and all the benefits accruing therefrom under 35 U.S.C. §119, the content of which in its entirety is herein incorporated by reference.

BACKGROUND

1. Field

Exemplary embodiments of the invention relate to a direct current-to-direct current ("DC-DC") converter included in an organic light emitting display 2. Description of the Related Art Recently, various types of flat panel are widely used. The flat panel display includes a liquid crystal display, a field emission display, a plasma display panel, an organic light emitting display, and the like.

Among these flat panel displays, the organic light emitting display displays images using organic light emitting diodes ("OLED"s) that emit light through recombination of electrons and holes. The organic light emitting display typically has a fast response speed and is driven with low power consumption. In a general organic light emitting display, current corresponding to a data signal is supplied to an organic light emitting diode, using a driving transistor included in each pixel, such that light is generated in the organic light emitting diode.

SUMMARY

Exemplary embodiments relate to a direct current-to-direct current converter driver ("DC-DC") converter, an organic light emitting display having the DC-DC converter and a method for operating the DC-DC converter which can prevent malfunction of the organic light emitting display.

According to an exemplary embodiment of the invention, a DC-DC converter includes: a buck-boost unit configured to receive an input power source supplied through an input power line, where the buck-boost unit outputs a first power source obtained by boosting the input power source and a second power source obtained by dropping the input power source; and a short-circuit sensing unit connected to the input power line and a control signal line, and configured to sense a short circuit between the input power line and the control signal line, where the short-circuit sensing unit turns off the buck-boost unit when the short circuit between the input power line and the control signal line occurs.

In an exemplary embodiment, when the short circuit between the input power line and the control signal line occurs, the short-circuit sensing unit may cut off the input power source supplied to the buck-boost unit.

In an exemplary embodiment, the short-circuit sensing unit may sense the short circuit between the input power line and the control signal line by comparing a voltage of the control signal with a reference voltage.

In an exemplary embodiment, the reference voltage may be lower than a voltage of the input power line.

In an exemplary embodiment, when the voltage of the control signal is higher than the reference voltage, the short-circuit sensing unit may determine that the short circuit between the input power line and the control signal line occurs.

In an exemplary embodiment, the short-circuit sensing unit may include a voltage dividing circuit configured to output a reference voltage by dividing a voltage of the input power source; a switching controller configured to compare a voltage of the control signal with the reference voltage, where the switching controller may output a switching control signal based on a result of the comparison; and a switch configured to control a coupling between the input power line and the buck-boost unit in response to the switching control signal.

According to another exemplary embodiment of the invention, an organic light emitting display includes: a pixel unit including pixels connected to scan lines and data lines; a scan driver configured to progressively supply a scan signal to the scan lines; a data driver configured to supply data signals to the data lines; a DC-DC converter driver configured to output a control signal, which corresponds to first and second power sources, to a control signal line; and a DC-DC converter configured to receive an input power source through an input power line and to receive the control signal through the control signal line, where the DC-DC converter supplies the first power source, which is obtained by boosting the input power source, and the second power source, which is obtained by dropping the input power source, to the pixel unit in response to the control signal, and the DC-DC converter is turned off when a short circuit between the input power line and the control signal line occurs.

In an exemplary embodiment, the DC-DC converter driver may detect an optimum voltage of the first and second power sources and stores information on the optimum voltage of the first and second power sources in a process of manufacturing the organic light emitting display, and the DC-DC converter driver may output the control signal corresponding to the optimum voltage when the organic light emitting display operates.

In an exemplary embodiment, the DC-DC converter may include a buck-boost unit configured to receive the input power source supplied through the input power line, where the buck-boost unit outputs the first power source obtained by boosting the input power source and the second power source obtained by dropping the input power source; and a short-circuit sensing unit configured to sense the short circuit between the input power line and the control signal line, where the short-circuit sensing unit turns off the buck-boost unit when the short circuit between the input power line and the control signal line occurs.

In an exemplary embodiment, the short-circuit sensing unit may include a voltage dividing circuit configured to output a reference voltage by dividing a voltage of the input power source; a switching controller configured to compare a voltage of the control signal with the reference voltage, where the switching controller outputs a switching control signal based on a result of the comparison; and a switch configured to control a coupling between the input power line and the buck-boost unit in response to the switching control signal.

According to another exemplary embodiment of the invention, a method for operating a DC-DC converter includes: sensing a short circuit between a control signal line and an input power line, where a control signal is supplied to the direct current-to-direct current converter through the control signal line, and an input power is supplied to the direct current-to-direct current converter through the input power line; stopping supplying first and second power sources from the direct current-to-direct current converter to a pixel unit when a short circuit between the input power line and the control signal line occurs; and supplying the first and second power sources from the direct current-to-direct current converter to the pixel unit when the short circuit between the input power line and the control signal line does not occur.

In an exemplary embodiment, the sensing the short circuit between the input power line and the control signal line may include: generating a reference voltage by dividing a voltage of the input power source; comparing a voltage of the control signal with the reference voltage; determining that the short circuit between the input power line and the control signal line occurs when the voltage of the control signal is higher than the reference voltage; and determining that the short circuit between the input power line and the control signal line does not occur when the voltage of the control signal is lower than the reference voltage.

In an exemplary embodiment, the first power source may be a power source obtained by boosting the input power source, and the second power source may be a power source obtained by dropping the input power source.

In an exemplary embodiment, the reference voltage may be lower than the voltage of the input power source.

BRIEF DESCRIPTION OF THE DRAWINGS

The above and other features of the invention will become more apparent by describing in detail exemplary embodiments thereof with reference to the attached drawings, in which.

DETAILED DESCRIPTION

The invention will be described more fully hereinafter with reference to the accompanying drawings, in which embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described in further detail with reference to the accompanying drawings.

Figure 1:
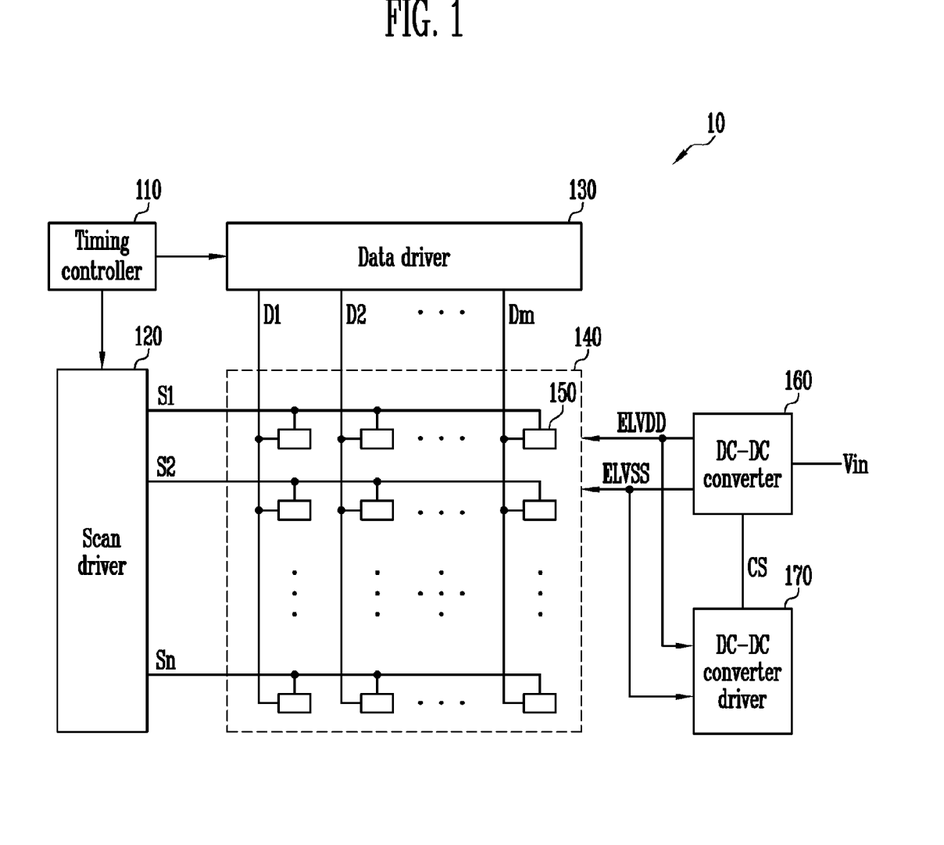
FIG. 1 is a block diagram illustrating an exemplary embodiment of an organic light emitting display according to the invention.

FIG. 1 is a block diagram illustrating an exemplary embodiment of an organic light emitting display according to the invention.

Referring to FIG. 1, an exemplary embodiment of the organic light emitting display 10 includes a timing controller 110, a scan driver 120, a data driver 130, a pixel unit 140, a direct current-to-direct current ("DC-DC") converter 160 and a DC-DC converter driver 170.

The timing controller 110 controls operations of the scan driver 120 and the data driver 130. In an exemplary embodiment, the timing controller 110 may rearrange data supplied from an outside of the organic light emitting display 10 and output the rearranged data to the data driver 130.

In an exemplary embodiment, the timing controller 110 may generate a scan driving control signal, in response to a synchronization signal (not shown) supplied from the outside of the organic light emitting display 10, and supply the generated scan driving control signal to the scan driver 120. In such an embodiment, the timing controller 110 may generate a data driving control signal, in response to a synchronization signal (not shown) supplied from the outside of the organic light emitting display 10, and supply the generated data driving control signal to the data driver 130.

The scan driver 120 progressively or sequentially supplies a scan signal to the pixel unit 140 through scan lines S1 to Sn (n is a natural number), under a control of the timing controller 110, e.g., based on the scan driving control signal output from the timing controller 110.

The data driver 130 supplies data signals to the pixel unit 140 through data lines D1 to Dm (m is a natural number) under a control of the timing controller 110, e.g., based on the data driving control signal output from the timing controller 110.

The pixel unit 140 includes pixels 150 arranged substantially in a matrix form including rows and columns. In an exemplary embodiment, each pixel 150 is connected to a corresponding data line of the data lines D1 to Dm and a corresponding scan line of the scan lines S1 to Sn. In one exemplary embodiment, for example, the pixels 150 are respectively disposed at intersection portions of the data lines D1 to Dm and the scan lines S1 to Sn.

Each pixel 150 emits light with luminance corresponding to a data signal supplied through the corresponding data line, in response to a scan signal supplied through the corresponding scan line.

Figure 2:
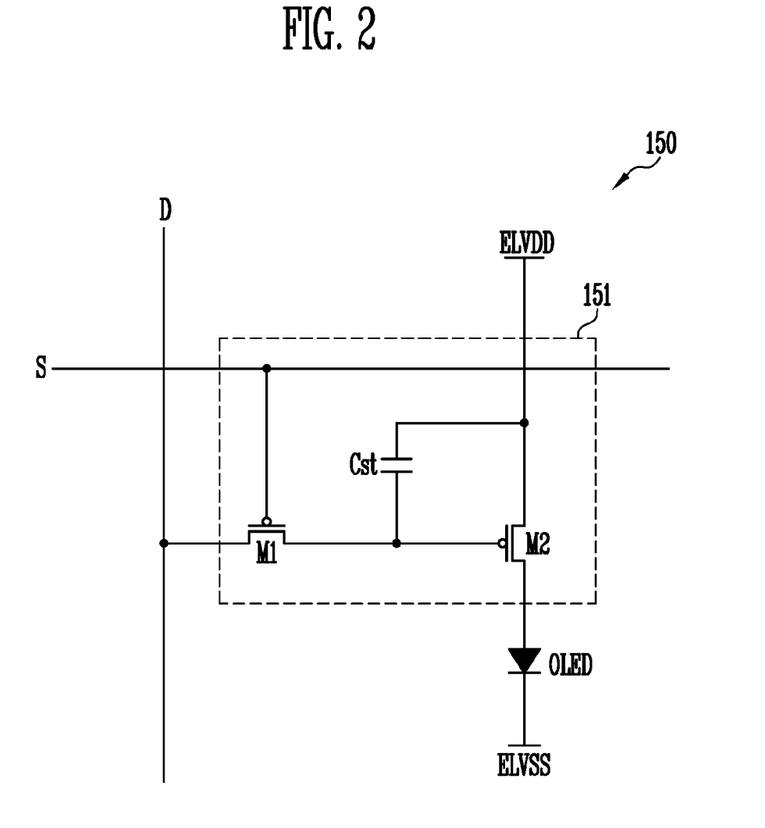
FIG. 2 is a circuit diagram illustrating an exemplary embodiment of a pixel shown in FIG. 1.

FIG. 2 is a circuit diagram illustrating an exemplary embodiment of a pixel shown in FIG. 1.

Referring to FIG. 2, a pixel 150 includes a pixel circuit 151 and an organic light emitting diode OLED.

The pixel circuit 151 is coupled to a corresponding data line Dk and a corresponding scan line S1 to control the organic light emitting diode OLED. Here, k is a natural number equal to or less than m, and l is a natural number equal to or less than n. The pixel circuit 151 controls the amount of current supplied to the organic light emitting diode OLED, corresponding to a data signal supplied through the data line Dk when a scan signal is supplied through the corresponding scan line S1.

The pixel circuit 151 includes a first transistor M1, a second transistor M2 and a storage capacitor Cst.

The first transistor M1 is coupled (e.g., electrically connected) between the data line Dm and the scan line Sn, and the second transistor M2 is coupled between a first power source ELVDD and the organic light emitting diode OLED. The storage capacitor Cst is coupled between a node, to which the first power source ELVDD and the second transistor M2 are coupled, and a node, to which the first and second transistors M1 and M2 are coupled.

In an exemplary embodiment, as shown in FIG. 2, a gate electrode of the first transistor M1 is coupled to the corresponding scan line S1. In such an embodiment, a first electrode of the first transistor M1 is coupled to the data line Dk, and a second electrode of the first transistor M1 is coupled to a first terminal of the storage capacitor Cst. In such an embodiment, the first electrode may be one of source and drain electrodes, and the second electrode may be the other of the source and drain electrodes. In one exemplary embodiment, for example, the first electrode may be the source electrode, and the second electrode may be the drain electrode.

The first transistor M1 is turned on when the scan signal is supplied to the corresponding scan line S1, to supply the data signal supplied through the corresponding data line Dk to the storage capacitor Cst. In such an embodiment, when the data signal is supplied to the storage capacitor Cst, the storage capacitor Cst charges a voltage corresponding to the data signal.

In an exemplary embodiment, a gate electrode of the second transistor M2 is coupled to the first terminal of the storage capacitor Cst. A first electrode of the second transistor M2 is coupled to a second terminal of the storage capacitor Cst and the first power source ELVDD, and a second electrode of the second transistor M2 is coupled to an anode electrode of the organic light emitting diode OLED.

The second transistor M2 controls the amount of a current flowing from the first power source ELVDD to a second power source ELVSS via the organic light emitting diode OLED, corresponding to the voltage stored in the storage capacitor Cst. In an exemplary embodiment, the organic light emitting diode OLED generates light based on the current supplied from the second transistor M2. In such an embodiment, the organic light emitting diode OLED may generate light corresponding to the controlled amount of the current from the second transistor M2.

The anode electrode of the organic light emitting diode OLED is coupled to the pixel circuit 151, and a cathode electrode of the organic light emitting diode OLED is coupled to the second power source ELVSS. In such an embodiment, as described above, the organic light emitting diode OLED generates light with a predetermined luminance corresponding to a current supplied from the pixel circuit 151.

The pixels 150 may emit light of various colors including red, green, blue, white, etc. based on types of organic light emitting diodes (not shown) included in the pixels 150 or colors of color filters disposed on the organic light emitting diodes.

The structure of an exemplary embodiment of the pixel 150 is shown in FIG. 2, but the invention is not limited to the structure of the pixel 150 shown in FIG. 2.

Referring back to FIG. 1, the DC-DC converter 160 receives an input power source supplied through an input power line Vin, and supplies driving power sources ELVDD and ELVSS to the pixel unit 140. In such an embodiment, the driving power sources ELVDD and ELVSS may have voltages corresponding to a control signal supplied through a control signal line CS.

According to an exemplary embodiment, the control signal may be a pulse width modulation ("PWM") signal. In such an embodiment, where the control signal is the PWM signal, the DC-DC converter driver 170 may drive the DC-DC converter 160 through a single line, and thus the structure of the organic light emitting display 10 is substantially simplified.

The DC-DC converter driver 170 supplies the control signal to the DC-DC converter 160 through the control signal line CS. In an exemplary embodiment, the control signal corresponds to a predetermined optimum voltage of the driving power sources ELVDD and ELVSS of the organic light emitting display 10. In such an embodiment, the DC-DC converter 160 supplies the driving power sources ELVDD and ELVSS having the predetermined optimum voltage based on the control signal.

In an exemplary embodiment, a register (not shown) disposed in the DC-DC converter driver 170 stores information on the optimum voltage of the driving power sources ELVDD and ELVSS, and the optimum voltage of the driving power sources ELVDD and ELVSS may be determined based on the characteristics of the organic light emitting display, e.g., the characteristic of the pixel unit 140 of the organic light emitting display 10. In one exemplary embodiment, for example, the optimum voltage of the driving power sources ELVDD and ELVSS may be detected in a manufacturing process of the organic light emitting display 10.

An exemplary embodiment of a process of detecting the optimum voltage of the driving power sources ELVDD and ELVSS in the manufacturing process of the organic light emitting display 10 will hereinafter be described in detail. In such a process, the DC-DC converter driver 170 changes the control signal until the optical characteristic of the pixel unit 140 of the organic light emitting display 10 is changed. In such a process, the DC-DC converter 160 may decrease the voltage of the first power source ELVDD or may increase the voltage of the second power source ELVSS in response to the control signal output from the DC-DC converter driver 170.

When the optical characteristic of the pixel unit 140 is changed while the DC-DC converter driver 170 changes the control signal, the DC-DC converter driver 170 stores, in the register thereof, information on the voltage of the first power source ELVDD and the voltage of the second power source ELVSS applied to the pixel unit 140 substantially immediately before the optical characteristic of the pixel unit 140 is changed.

If the input power line Vin and the control signal line CS are short-circuited with each other, the DC-DC converter 160 does not supply the control signal supplied through the control signal line CS to the pixel unit 140, but supplies the driving power sources ELVDD and ELVSS, which correspond to the voltage of the input power source supplied through the input power line Vin, to the pixel unit 140. Accordingly, if the input power line Vin and the control signal line CS are short-circuited with each other, the voltages of the driving power sources ELVDD and ELVSS supplied from the DC-DC converter 160 are not changed when the DC-DC converter driver 170 changes the control signal to detect the optimum voltage of the driving power sources ELVDD and ELVSS, and hence the optical characteristic of the pixel unit 140 is not changed. Therefore, the DC-DC converter driver 170 may not effectively detect or erroneously detects the optimum voltage of the driving power sources ELVDD and ELVSS.

In such a process, the DC-DC converter 160 may be turned off when the input power line Vin and the control signal line CS are short-circuited with each other such that malfunction of the DC-DC converter driver 170 for detecting the optimum voltage of the driving power sources ELVDD and ELVSS is effectively prevented.

Figure 3:
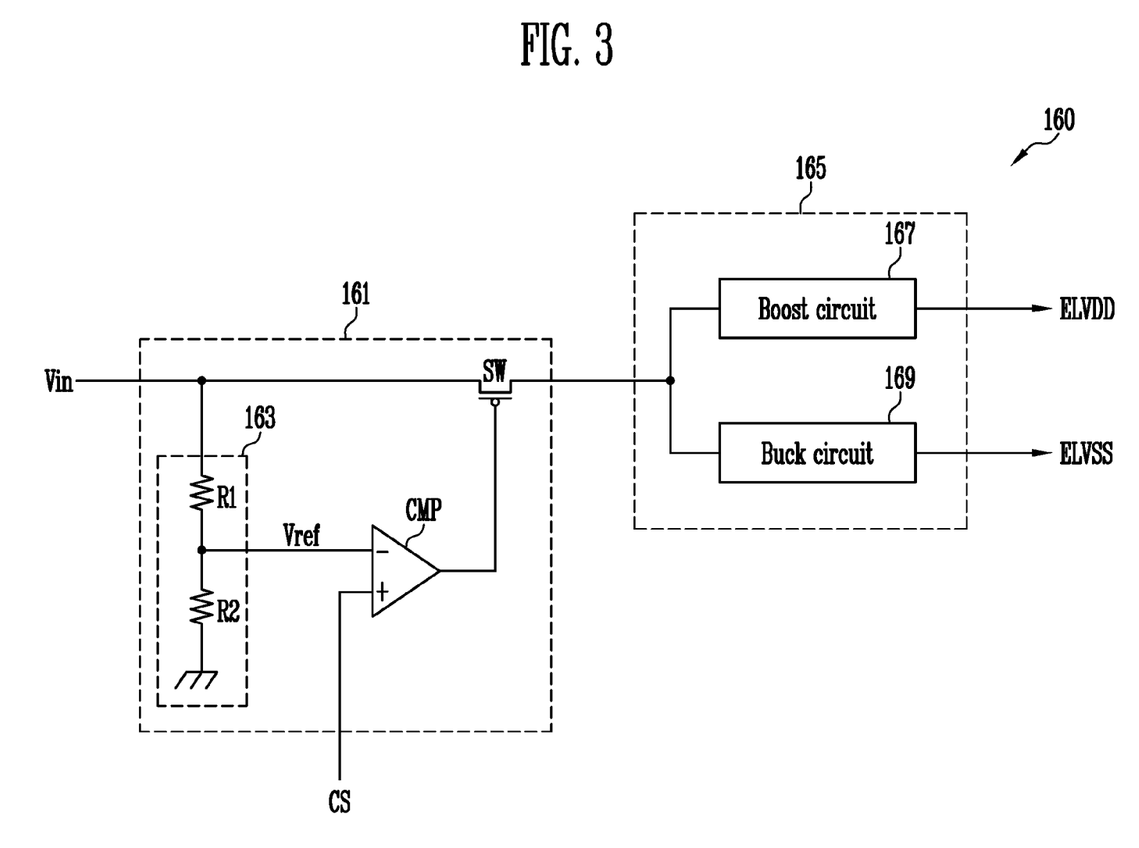
FIG. 3 is a diagram illustrating an exemplary embodiment of a the direct current-to-direct current converter driver ("DC-DC") converter shown in FIG. 1.

FIG. 3 is a diagram illustrating an exemplary embodiment of the DC-DC converter shown in FIG. 1.

Referring to FIG. 3, the DC-DC converter 160 includes a short-circuit sensing unit 161 and a buck-boost unit 165.

In an exemplary embodiment, the short-circuit sensing unit 161 senses a short circuit between the input power line Vin and the control signal line CS, and turns off the buck-boost unit 165 when the short circuit between the input power line Vin and the control signal line CS occurs. In such an embodiment, the short-circuit sensing unit 161 blocks an input power source from being supplied to the buck-boost unit 165 when the short circuit between the input power line Vin and the control signal line CS occurs.

In such an embodiment, the short-circuit sensing unit 161 compares a voltage of the control signal with a reference voltage Vref to sense the short circuit between the input power line Vin and the control signal line CS. In such an embodiment, when the voltage of the control signal is higher than a reference voltage Vref, the short-circuit sensing unit 161 determines that the short circuit between the input power line Vin and the control signal line CS has occurred. In such an embodiment, when the voltage of the control signal is lower than the reference voltage Vref, the short-circuit sensing unit 161 determines that the short circuit between the input power line Vin and the control signal line CS has not occurred. In an exemplary embodiment, the reference voltage Vref is lower than the voltage of the input power source.

The short-circuit sensing unit 161 includes a voltage dividing circuit 163, a comparator CMP and a switch SW.

The voltage dividing circuit 163 generates the reference voltage Vref by dividing the voltage of the input power source. The amplitude of the reference voltage Vref is determined based on a ratio between resistors R1 and R2.

The comparator CMP compares the voltage of the control signal with the reference voltage Vref, and outputs a result signal, which is a signal generated based on the result of comparison. In such an embodiment, when the reference voltage Vref is higher than the voltage of the control signal, the comparator CMP outputs a result signal having a negative voltage. In such an embodiment, when the reference voltage Vref is lower than the voltage of the control signal, the comparator CMP outputs a result signal having a positive voltage. The result signal is supplied to the switch SW as a switching control signal.

The switch SW controls the coupling between the input power line Vin and the buck-boost unit 165, in response to the result signal, which is the switching control signal thereof, output from the comparator CMP. In such an embodiment, when the switching control signal has a negative voltage, i.e., when the reference voltage Vref is higher than the voltage of the control signal, the switch SW is turned on.

When the switch SW is turned on, the buck-boost unit 165 receives an input power source supplied through the input power line Vin, and supplies a first power source, which is obtained by boosting the input power source, and a second power source, which is obtained by dropping the input power source, to the pixel unit 140.

In such an embodiment, the buck-boost unit 165 includes a boost circuit 167 and a buck circuit 169. The boost circuit 167 boosts the input power source, and supplies the boosted input power source as the first power source ELVDD to the pixel unit 140. The buck circuit 169 drops the input power source, and supplies the dropped input power source as the second power source ELVSS to the pixel unit 140.

In an exemplary embodiment, as illustrated in FIG. 1, the timing controller 110, the scan driver 120, the data driver 130, the DC-DC converter 160 and the DC-DC converter driver 170 may be components separate from one another, but the invention is not limited thereto. In an alternative exemplary embodiment, the timing controller 110, the scan driver 120, the data driver 130, the DC-DC converter 160 and the DC-DC converter driver 170 may be implemented as separate chips or a single chip.

Figure 4:
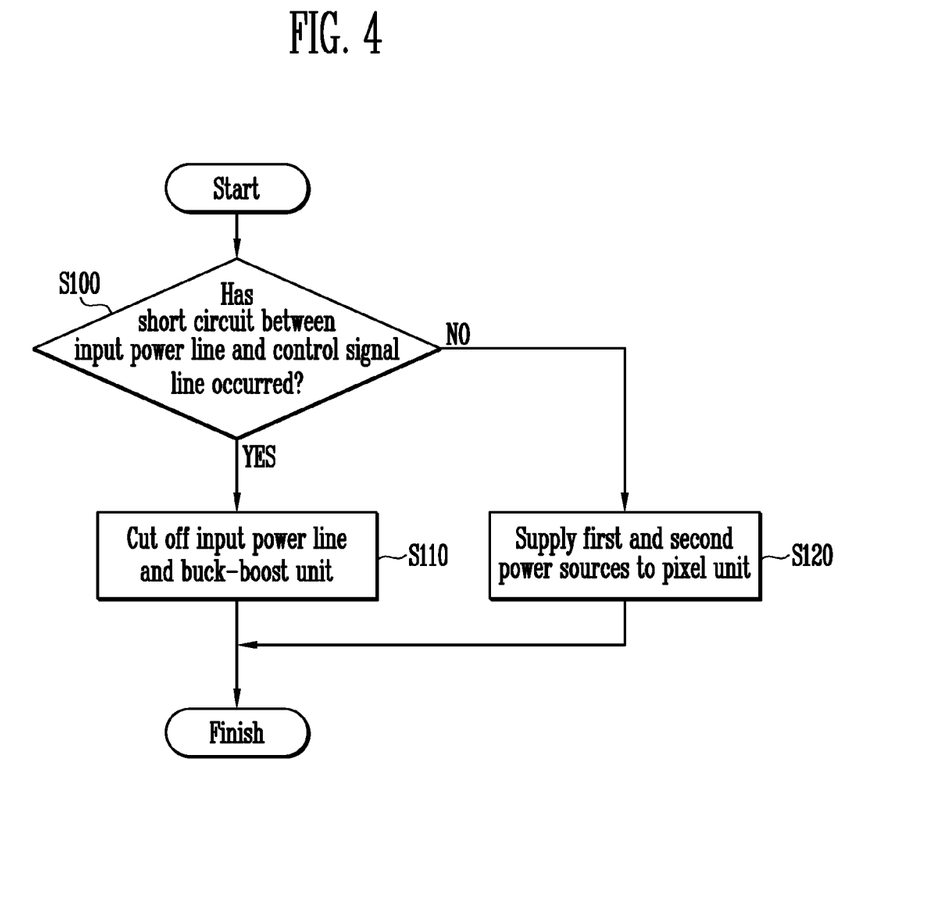
FIG. 4 is a flowchart illustrating an exemplary embodiment of a method of operating the DC-DC converter shown in FIG. 1.

FIG. 4 is a flowchart illustrating an exemplary embodiment of a method for operating the DC-DC converter shown in FIG. 1.

Referring to FIG. 4, the DC-DC converter 160 senses a short circuit between the control signal line CS and the input power line Vin, through which an input power source is supplied (S100). In an exemplary embodiment, the DC-DC converter 160 generates a reference voltage Vref by dividing the voltage of the input power source through the input power line Vin, and the comparator CMP compares the voltage of the control signal with the reference voltage Vref. In such an embodiment, based on a result of the comparison, the DC-DC converter 160 determines that the short circuit between the input power line Vin and the control signal line CS has occurred when the voltage of the control signal is higher than the reference voltage Vref, and determines that the short circuit between the input power line Vin and the control signal line CS has not occurred when the voltage of the control signal is lower than the reference voltage Vref.

When the short circuit between the input power line Vin and the control signal line CS occurs, the DC-DC converter 160 does not supply driving power sources ELVDD and ELVSS to the pixel unit 140. In one exemplary embodiment, for example, when the short circuit between the input power line Vin and the control signal line CS occurs the coupling between the input power line Vin and the buck-boost unit 165 may be cut off (S110).

In such an embodiment, when the short circuit between the input power line Vin and the control signal line CS does not occur, the DC-DC converter 160 supplies a first power source ELVDD, which is obtained by boosting the input power source, and a second power source ELVSS, which is obtained by dropping the input power source, to the pixel unit 140 (S120).

In an exemplary embodiment, as illustrated in FIGS. 1 to 4, the amplitude of the voltage of the first power source ELVDD and the amplitude of the voltage of the second power source ELVSS may be controlled by a control signal supplied to the DC-DC converter 160 through the control signal line CS, but the invention is not limited thereto. In one alternative exemplary embodiment, for example, the voltage of the first power source ELVDD is predetermined to be maintained substantially constant based on a specific structure of the organic light emitting display 10, the amplitude of the voltage of the first power source ELVDD may not be controlled by the control signal.

According to exemplary embodiments of the invention as described herein, each pixel of an organic light emitting display includes an organic light emitting diode configured to emit light with luminance corresponding to a current flowing from a first power source to a second power source. The first and second power sources, e.g., driving power sources, are supplied from a DC-DC converter provided in the organic light emitting display to the pixels. In such an embodiment, the first power source may be obtained by boosting an input power source, and the second power source may be obtained by dropping the input power source.

If there is no limitation in the supply of power, the voltage of the first power source and the voltage of the second power source may be designed to have a sufficient margin. However, the supply of power is typically limited to minimize power consumption. Accordingly, in an exemplary embodiment, the voltage of the first power source may be set substantially low and the voltage of the second power source may be set substantially high based on the condition where the optical characteristic of the organic light emitting diode may be maintained.

The setting of the voltage of the driving power source may be performed in a manufacturing process of the organic light emitting display. A process of setting the optimum voltage of the driving power source, e.g., the first power source or the second power source, may be performed as in the exemplary embodiments described above. In one exemplary embodiment, for example, the second voltage may be increased based on a control signal supplied to the DC-DC converter, and when the increased second voltage has a maximum voltage while maintaining the optical characteristic of the organic light emitting diode, information on the control signal corresponding to the maximum voltage of the increased second voltage is stored in a register of the DC-DC converter driver provided in the organic light emitting display.

Based on the information on the control signal stored in the register, the DC-DC converter supplies a driving power source having the optimum voltage to the pixel unit.

In such an embodiment, when a control signal line configured to the control signal in the process of setting the optimum voltage is short-circuited with another line, e.g., an input power line configured to supply an input power source to the DC-DC converter, the information stored in the register may not correspond to the optimum voltage. In a conventional manufacturing of the organic light emitting display, such an error may not be efficiently detected.

In exemplary embodiments of the DC-DC converter and the method for driving the same according to the invention, malfunction of the organic light emitting display is effectively prevented by sensing a short circuit between the input power line and the control signal line.

The invention should not be construed as being limited to the exemplary embodiments set forth herein. Rather, the exemplary embodiments are provided so that this disclosure will be thorough and complete and will fully convey the concept of the invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A direct current-to-direct current converter, comprising:
a buck-boost unit configured to receive an input power source supplied through an input power line, wherein the buck-boost unit outputs a first power source obtained by boosting the input power source and a second power source obtained by dropping the input power source; and
a short-circuit sensing unit connected to the input power line and a control signal line, and configured to sense a short circuit between the input power line and the control signal line, wherein the short-circuit sensing unit turns off the buck-boost unit when the short circuit between the input power line and the control signal line occurs.

2. The direct current-to-direct current converter of claim 1, wherein, when the short circuit between the input power line and the control signal line occurs, the short-circuit sensing unit cuts off the input power source supplied to the buck-boost unit.

3. The direct current-to-direct current converter of claim 1, wherein the short-circuit sensing unit senses the short circuit between the input power line and the control signal line by comparing a voltage of the control signal with a reference voltage.

4. The direct current-to-direct current converter of claim 3, wherein the reference voltage is lower than a voltage of the input power source.

5. The direct current-to-direct current converter of claim 4, wherein, when the voltage of the control signal is higher than the reference voltage, the short-circuit sensing unit determines that the short circuit between the input power line and the control signal line occurs.

6. The direct current-to-direct current converter of claim 1, wherein the short-circuit sensing unit comprises:
 a voltage dividing circuit configured to output a reference voltage by dividing a voltage of the input power source;
 a switching controller configured to compare a voltage of the control signal with the reference voltage, wherein the switching controller outputs a switching control signal based on a result of the comparison; and
 a switch configured to control a coupling between the input power line and the buck-boost unit in response to the switching control signal.

7. An organic light emitting display, comprising:
 a pixel unit comprising pixels connected to scan lines and data lines;
 a scan driver configured to progressively supply a scan signal to the scan lines;
 a data driver configured to supply data signals to the data lines;
 a direct current-to-direct current converter driver configured to output a control signal, which corresponds to first and second power sources, to a control signal line; and
 a direct current-to-direct current converter configured to receive an input power source through an input power line and to receive the control signal through the control signal line,
 wherein
 the direct current-to-direct current converter supplies the first power source, which is obtained by boosting the input power source, and the second power source, which is obtained by dropping the input power source, to the pixel unit in response to the control signal, and
 the direct current-to-direct current converter is turned off when a short circuit between the input power line and the control signal line occurs.

8. The organic light emitting display of claim 7, wherein
 the direct current-to-direct current converter driver detects an optimum voltage of the first and second power sources and stores information on the optimum voltage of the first and second power sources in a process of manufacturing the organic light emitting display, and
 the direct current-to-direct current converter driver outputs the control signal corresponding to the optimum voltage when the organic light emitting display operates.

9. The organic light emitting display of claim 7, wherein the direct current-to-direct current converter comprises:
 a buck-boost unit configured to receive the input power source supplied through the input power line, wherein the buck-boost unit outputs the first power source obtained by boosting the input power source and the second power source obtained by dropping the input power source; and
 a short-circuit sensing unit configured to sense the short circuit between the input power line and the control signal line, wherein the short-circuit sensing unit turns off the buck-boost unit when the short circuit between the input power line and the control signal line occurs.

10. The direct current-to-direct current converter of claim 9, wherein the short-circuit sensing unit senses the short circuit between the input power line and the control signal line by comparing a voltage of the control signal with a reference voltage.

11. The direct current-to-direct current converter of claim 10, wherein the reference voltage is lower than a voltage of the input power source.

12. The direct current-to-direct current converter of claim 11, wherein, when the voltage of the control signal is higher than the reference voltage, the short-circuit sensing unit determines that the short circuit between the input power line and the control signal line occurs.

13. The organic light emitting display of claim 9, wherein the short-circuit sensing unit comprises:
 a voltage dividing circuit configured to output a reference voltage by dividing a voltage of the input power source;
 a switching controller configured to compare a voltage of the control signal with the reference voltage, wherein the switching controller outputs a switching control signal according to a result of the comparison; and
 a switch configured to control a coupling between the input power line and the buck-boost unit in response to the switching control signal.

14. A method for operating a direct current-to-direct current converter, the method comprising:
 sensing a short circuit between a control signal line and an input power line, wherein a control signal is supplied to the direct current-to-direct current converter through the control signal line, and an input power source is supplied to the direct current-to-direct current converter through the input power line;
 stopping supplying first and second power sources from the direct current-to-direct current converter to a pixel unit when the short circuit between the input power line and the control signal line occurs; and
 supplying the first and second power sources from the direct current-to-direct current converter to the pixel unit when the short circuit between the input power line and the control signal line does not occur.

15. The method of claim 14, wherein the sensing the short circuit between the input power line and the control signal line comprises:
 generating a reference voltage by dividing a voltage of the input power source;
 comparing a voltage of the control signal with the reference voltage;
 determining that the short circuit between the input power line and the control signal line occurs when the voltage of the control signal is higher than the reference voltage; and
 determining that the short circuit between the input power line and the control signal line does not occur when the voltage of the control signal is lower than the reference voltage.

16. The method of claim 14, wherein
 the first power source is a power source obtained by boosting the input power source, and the second power source is a power source obtained by dropping the input power source.

17. The method of claim 15, wherein the reference voltage is lower than the voltage of the input power source.

\* \* \* \* \*